United States Patent [19]

Dunn

[11] Patent Number: 5,752,160
[45] Date of Patent: May 12, 1998

[54] INTERACTIVE ENTERTAINMENT NETWORK SYSTEM AND METHOD WITH ANALOG VIDEO STARTUP LOOP FOR VIDEO-ON-DEMAND

[76] Inventor: Matthew W. Dunn, 5609 6th Ave. NW., Seattle, Wash. 98107

[21] Appl. No.: 437,131

[22] Filed: May 5, 1995

[51] Int. Cl.[6] .................................................. H04N 7/10
[52] U.S. Cl. .......................... 455/5.1; 348/13; 348/12; 348/7; 348/6; 455/6.1; 455/3.1
[58] Field of Search ............................ 348/7, 12, 13, 348/906, 8, 10, 6; 455/3.1, 4.2, 5.1, 6.1; H04N 7/10

[56] References Cited

U.S. PATENT DOCUMENTS

| | | | |
|---|---|---|---|
| 4,081,754 | 3/1978 | Jackson | 325/396 |
| 4,203,130 | 5/1980 | Doumit et al. | 358/1 |
| 4,228,543 | 10/1980 | Jackson | 358/191.1 |
| 4,694,490 | 9/1987 | Harvey et al. | 380/20 |
| 4,704,725 | 11/1987 | Harvey et al. | 380/9 |
| 4,706,121 | 11/1987 | Young | 358/142 |
| 4,751,578 | 6/1988 | Reiter et al. | 358/183 |
| 4,908,713 | 3/1990 | Levine | 358/335 |
| 4,947,244 | 8/1990 | Fenwick et al. | 358/86 |
| 4,977,455 | 12/1990 | Young | 358/84 |
| 5,038,211 | 8/1991 | Hallenbeck | 358/142 |
| 5,068,734 | 11/1991 | Beery | 358/114 |
| 5,133,079 | 7/1992 | Ballantyne et al. | 455/4.1 |
| 5,151,789 | 9/1992 | Young | 358/194.1 |
| 5,168,353 | 12/1992 | Walker et al. | 358/86 |
| 5,233,654 | 8/1993 | Harvey | 380/20 |
| 5,307,173 | 4/1994 | Yuen et al. | 358/335 |
| 5,335,079 | 8/1994 | Yuen et al. | 358/335 |
| 5,335,277 | 8/1994 | Harvey et al. | 380/20 |
| 5,353,121 | 10/1994 | Young et al. | 348/563 |
| 5,410,344 | 4/1995 | Graves et al. | 348/1 |
| 5,416,508 | 5/1995 | Sakuma et al. | 348/3 |
| 5,426,699 | 6/1995 | Wunderlich et al. | 380/20 |
| 5,446,490 | 8/1995 | Blahut et al. | 348/12 |
| 5,479,266 | 12/1995 | Young et al. | 358/335 |
| 5,479,268 | 12/1995 | Young et al. | 358/335 |
| 5,483,278 | 1/1996 | Strubbe et al. | 348/12 |
| 5,485,197 | 1/1996 | Hoarty | 348/12 |
| 5,508,732 | 4/1996 | Bottomley et al. | 348/7 |
| 5,524,195 | 6/1996 | Clanton, III et al. | 348/13 |
| 5,539,449 | 7/1996 | Blahut et al. | 348/7 |
| 5,550,577 | 8/1996 | Verviest et al. | 348/7 |
| 5,555,441 | 9/1996 | Haddad | 455/4.2 |
| 5,559,548 | 9/1996 | Davis et al. | 348/6 |
| 5,561,708 | 10/1996 | Remillard | 379/96 |
| B1 4,706,121 | 12/1993 | Young | 358/142 |

*Primary Examiner*—Michael H. Lee
*Assistant Examiner*—Linus H. Lo
*Attorney, Agent, or Firm*—Lee & Hayes, PLLC

[57] ABSTRACT

An interactive entertainment network system supplies previews in an analog format while operating in a video-on-demand (VOD) mode. The previews are displayed instantaneously when a viewer switches to a designated VOD channel. The previews are played in a continuous loop to attract viewers that are switching through channels. The VOD channel therefore appears like traditional broadcast channels, as opposed to a still screen. In this manner, the viewer will be less inclined to skip past the VOD channel. If the viewer does nothing, the previews of the new releases cycle through, one after another. No digital resources are utilized to this point; rather, the analog video stream is continually transmitted in a "broadcast" fashion. However, if the viewer actively requests information or a new set of previews while in the VOD application, the system ceases the analog presentation and transitions to a fully interactive digital system. Any requested programs or other information is supplied from the headend in a digital format. After a period of inactivity, the system reverts to playing the analog video stream of previews to further conserve digital resources.

22 Claims, 11 Drawing Sheets

Fig. 8

PROGRAM TABLE (120)

| ID | TITLE | MONIKER |
|---|---|---|
| 501 | TITLE 1 | TITLE1.MOD |
| 502 | TITLE 2 | TITLE2.MOD |
| 503 | TITLE 3 | TITLE3.MOD |

PROGRAM/TRAILER JOIN TABLE (128)

| PROGRAM ID | TRAILER ID |
|---|---|
| 501 | 901 |
| 502 | 902 |
| 503 | 903 |

TRAILER TABLE (126)

| ID | TITLE | MONIKER |
|---|---|---|
| 901 | TRAILER 1 | TRAILER1.MOD |
| 902 | TRAILER 2 | TRAILER2.MOD |
| 903 | TRAILER 3 | TRAILER3.MOD |

| TITLE | LENGTH | PROGRAM ID | PROGRAM MONIKER | TRAILER ID | TRAILER MONIKER | RENTAL PERIOD |
|---|---|---|---|---|---|---|
| TITLE 1 | 3460 | 501 | TITLE1.MOD | 901 | TRAILER1.MOD | 24 |
| TITLE 2 | 2970 | 502 | TITLE2.MOD | 902 | TRAILER2.MOD | 48 |
| TITLE 3 | 5490 | 503 | TITLE3.MOD | 903 | TRAILER3.MOD | 48 |

INTERACTIVE ENTERTAINMENT NETWORK SYSTEM AND METHOD WITH ANALOG VIDEO STARTUP LOOP FOR VIDEO-ON-DEMAND

TECHNICAL FIELD

This invention relates to interactive entertainment network systems, such as interactive television (ITV) systems, and to methods for operating such interactive entertainment network systems.

BACKGROUND OF THE INVENTION

Movie and television audiences are very familiar with previews, those one to three minute video clips that reveal highlights of upcoming shows. The preview clips, which are known as "trailers" in the film industry, are important promotional tools. They play on viewer emotions to entice viewers to see the program. The trailers are carefully crafted by the studios to present the most compelling sales pitch for watching a program. Given the importance of trailers, it is not uncommon for a studio to allocate a significant portion of the entire program budget to the production of a short trailer.

In the newer, interactive television (ITV) environment, it would be advantageous to provide trailers to attract potential viewers into renting a program over the interactive network. ITV systems have a single computerized control center, known as the "headend," which interactively communicates with multiple distributed television units located in subscriber homes. The headend provides traditional forms of programming, such as the familiar cable and broadcast programs, as well as newer forms of programming, such as video-on-demand. Typically, the ITV has one or more designated channels dedicated to video-on-demand. In the video-on-demand (VOD) mode of operation, a viewer can order video movies directly from his/her own television set and the movies are delivered over the designated channels. Indeed, in a full interactive entertainment network system like this invention, it is contemplated that a viewer will be able to order "on demand" movies, video games, television shows, and other video content programs from their home.

Video trailers would be particularly useful for the ITV video-on-demand mode to entice viewers into renting a movie, video game, or TV show. However, there is an unresolved issue with respect to how trailers can be conveniently and rapidly supplied to selective viewer homes. Present designs of ITV systems anticipate having hundreds to thousands of movies, video games, and TV shows stored at the headend. The trailers for these programs will also be stored at the headend.

The programs and trailers are stored in digital format as individual data files. When a viewer orders a movie, for example, the user interface unit send a message to the headend. The message contains information identifying the movie. The headend locates and retrieves the movie and then transmits it back over the network to the user interface unit. Under present technologies, this process might take a few seconds or even longer. Since the previews are also digital files, just like the full length movies themselves, the ITV system experiences similar transaction delays between the time a preview is requested and time it is received.

As a result, when a viewer tunes to the VOD channel, the ITV system will initially display a still screen on the viewer's TV set. The system does not have adequate time during start-up to request and receive a video stream of a preview or program from the headend. Typically, the still screen has a menu of programs, or instructions on how to order the movies, or some form of advertising.

In today's remote control TV world, viewers have become conditioned to quickly scanning television channels, one after another, often staying on a channel for only a few seconds. This practice is known as "channel surfing". In conventional cable and broadcast systems, the programs appear instantaneously as the TV set is tuned to the appropriate channel. This immediacy upon tuning to a channel affords the viewer freedom to channel surf. Viewers enjoy the instantaneous video sensation of surfing through channels. Unfortunately, a still screen presentation, whether on the VOD channel or elsewhere, presents little stimulus to retain the viewer on the channel. Instead, the viewer often surfs right on through the channel. Even if the user interface unit attempted to immediately call up a digital video stream of a preview or program rather than using a still screen, the transaction delay inherent in the ITV system might be too long for a viewer to "wait-and-see" as they flip through channels.

It is therefore an object of this invention to provide an interactive entertainment system that immediately supplies viewer-attracting previews when the viewer switches to the VOD channel.

Another potential problem in the design evolution of ITV concerns the expected traffic on digital resources. A sophisticated network of digital communications is necessary to make an ITV system fully responsive to the individual whims of each subscriber. The ITV system will likely employ digital switching, cabling, computerized load controllers, and other equipment to satisfy the subscriber demand. For example, an ITV system designed to support digital information to 10,000 homes simultaneously requires digital switching with the capacity for 10,000 concurrent connections. This problem is not unlike the task of supporting a telephone system which reaches into each home.

It would be advantageous from a systems standpoint not to foolishly waste the precious digital resources. However, in a fully interactive system, simply tuning to the VOD channel might result in digital communication between the subscriber's TV unit and the headend which thereby consumes a portion of the digital resources. If the viewer is simply channel surfing, and spends very little time on the VOD channel, this initializing communication becomes a waste of digital resources.

It is therefore another object of this invention to provide an interactive entertainment system that conserves precious digital resources.

SUMMARY OF THE INVENTION

This invention provides an interactive entertainment network system which supplies previews instantaneously upon entering the video-on-demand (VOD) mode. The previews are played in a continuous loop to attract viewers that are switching through the channels. In this manner, the VOD channel appears like traditional broadcast channels, as opposed to a still screen, so that viewers will be less inclined to skip past the channel.

The interactive entertainment network system of this invention has a headend connected to multiple user interface units in individual homes via a distribution network, such as cable, RF, and/or satellite network. The headend provides full length programs and associated previews to the user interface units, which are commonly referred to as "set-top boxes" in the ITV arena.

The headend has a continuous media server (CMS) database which stores the actual video data streams of[]both the full length video content programs and their associated preview video trailers. The video data streams are stored in a digital format as individual data files. Unique monikers are assigned to each program and trailer to locate them within the CMS database. The headend also has a program information database which maintains program data records pertaining to the video content programs and preview video trailers. The program data records contain information about the programs and trailers, such as an ID, title, moniker, cast members, director, rating, length of movie, brief description, and so on.

The headend also has a video processing unit which converts the trailers from their digital format to an analog format. Preferably, a preset group of trailers, such as previews for "new release" movies, are converted by the video processing unit. Once converted, the analog video stream of previews is transmitted over a designated VOD channel to all of the user interface units. The video processing unit computes a schedule of the previews according to the order that they appear in the analog video stream. This schedule is posted with the user interface units.

Each user interface unit has a processor and a video-on-demand (VOD) application which executes on that processor. The VOD application is activated by switching to the designated VOD channel, either by surfing or directly switching to that channel. Upon tuning to the VOD channel, the analog video stream of trailers from the headend is immediately displayed. The user interface unit also displays the title, rating, cost, or other information pertaining to each displayed preview. This information is received from the headend as part of the posted schedule.

If the viewer does nothing, the previews cycle through, one after another. No digital resources are used at this point; rather, the analog video stream is continually transmitted in a "broadcast" fashion. However, if the viewer actively requests information or a new set of previews while in the VOD application, the system ceases the analog presentation and transitions to a fully interactive digital system. For instance, if the viewer orders a program, the user interface unit transmits a digital request which the headend uses to retrieve the program from the CMS database. The headend then transmits the program as a digital video data stream back to the user interface unit. The digital program can be easily manipulated by the user interface unit.

After a period of inactivity, the interactive entertainment network system reverts to playing the analog video stream of previews. In this manner, the interactive system conserves the precious digital resources for other viewers who might be requesting programs or other information.

BRIEF DESCRIPTION OF THE DRAWINGS

FIG. 8 is a simplified example of database records and a join table used to correlate program and associated trailer IDs.

FIG. 9 is a simplified example of a data packet of program information that is sent from the headend to the STB.

DETAILED DESCRIPTION OF THE PREFERRED EMBODIMENT

Figure 1:
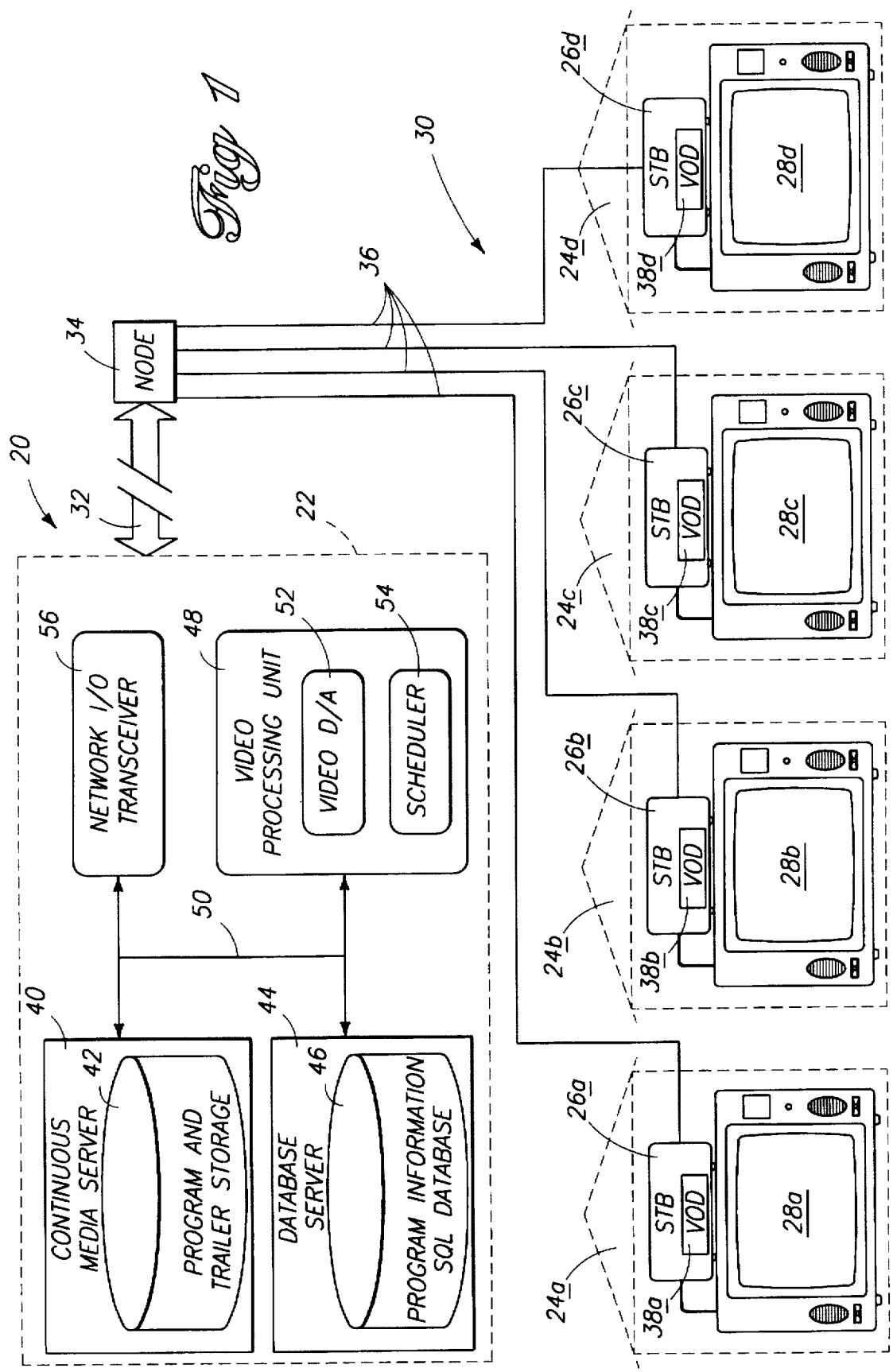
FIG. 1 is a block diagram of a interactive entertainment network system according to this invention.

FIG. 1 shows an interactive entertainment network system 20 in the form of an interactive television (ITV) system. System 20 includes a centralized headend or headend server 22 which is configured to provide video content programs to multiple subscriber homes. Representative homes 24a–24d are shown. The video content programs provided by headend 22 might include traditional broadcast TV shows, cable programs, on-demand movies, video games, and other services such as those commonly provided in the past by on-line computer services. A single headend might service 250,000 or more homes.

Each home has a user interface unit 26a–26d, commonly referred to as a set-top box (STB), coupled to a television set (TV) or video display device 28a–28d. The user interface units receive digital video signals from headend 22 and control which programs are displayed on the associated TVs. Instead of separate STBs, a user interface unit can be incorporated in the TV itself in other implementations.

Headend 22 is interconnected to the subscribers' homes 24a–24d via a multi-tier network or distribution structure 30. In the illustrated embodiment, distribution structure 30 includes a high-speed, high-bandwidth fiber optic cable network 32 coupled to regional distribution nodes (represented by distribution node 34). The speed and bandwidth of the fiber optic cable affords the desired performance for supporting a fully interactive system. Each distribution node 34 is connected to multiple user interface units 26a–26d via conventional home entry lines 36, such as twisted-pair lines or coaxial cable. As an example, each distribution node 34 supports approximately 1200 homes. As technology continues to improve, it is believed that parts of the distribution structure can be replaced with wireless forms of communication, such as RF communication or satellite communication.

Each user interface unit 26a–26d is configured to run a video-on-demand (VOD) application 38a–38d. VOD is like having a video store in your own home. Viewers are permitted to browse a wide selection of movies, video games, and TV shows, and rent the program they want to see immediately from their own TV sets. The VOD application is activated when a viewer switches to a designated VOD channel on the STB.

Headend 22 provides both video content programs and associated preview video trailers to the user interface unit within each home. Headend 22 includes a continuous media server (CMS) 40 with a program and trailer storage 42 to store the digital video data streams as independent files. Each data file represents a full length video content program—such as a feature-length movie, video game, or past TV show—or a preview of that movie, game, or show. Present designs of program and trailer storage 42 are expected to hold hundreds to thousands of full length programs and their trailers.

Unique monikers are assigned to each data file (i.e., each full length program and each trailer). The monikers are used to locate the corresponding data file within the continuous media server database at the headend. The continuous media server is preferably implemented as a disk array data storage system consisting of many large capacity storage disks, each on the order of one to several Gigabytes. The video data streams are stored digitally on the storage disks in predetermined or mapped locations. The locations of the video data streams are kept in a memory map and each video data stream can be accessed through pointers to the particular memory location.

The continuous media server can service simultaneous requests to view a program "on demand" (and even the same program) from thousands of homes. The digitally stored video data streams can be accessed by any number of viewers at the same or staggered times. For example, one household might request a video data stream of a movie at 8:00 pm, and a second household might request the same video data stream of that movie at 8:02 pm. This situation is easily accommodated by slightly staggered pointers to the same video data stream beginning at the same memory location within program and trailer storage 42.

Headend 22 also has a database server 44 to store the programming information about each program and trailer. Database server 44 contains a structured query language (SQL) database 46 with program data records containing information relating to available movies, games, TV shows, or other programs. The SQL records reflect such things as the program title, cast members, director, rating, whether the program has closed captioning or stereo audio, length of program, scheduled time of the program, network name, program category, description text, and so forth. The program information is used by the VOD application and other applications running on the STB (such as the electronic programming guide) to assist the viewer when previewing different programs.

The program data records stored in SQL database 46 contain unique program IDs that are assigned to each full length video content program and unique trailer IDs that are assigned to each video trailer. The program and trailer IDs are employed as a shorthand identification tag for rapid search of SQL database 46 and for establishing relational ties between a program and its associated trailer. The program data records further contain the monikers to locate the programs and trailers within CMS storage 42. These monikers are short name descriptors that represent or call to indexing pointers to storage locations within storage 42 of continuous media server 40. The pointers identify storage locations of the video data streams of the programs and trailers that correspond to the information listed in the SQL database.

A video processing unit 48 is also provided at headend 22. Video processing unit 48 is connected to both the CMS database and the SQL database via headend bus 50. The video processing unit has a video digital-to-analog (D/A) converter 52 which converts the digital video data streams from CMS program and trailer storage 42 into an analog video stream. For this function, video processing unit is essentially a glorified set-top box that is located at the headend to convert the digital data into displayable analog video before transmission to the user interface units.

Video processing unit 48 includes a scheduler 54 which determines a schedule of the previews that are transmitted to the user interface units. In one implementation, the video processing unit works with a selected number of previews from the CMS database, which can be continuously repeated. As an example, the video processing unit might convert and output a continues loop of "new releases" trailers which consists of a predefined group of about 20–40 of the newest video programs that are presently available for rent. The schedule produced by scheduler 54 contains timing information and a presentation order in which the video trailers appear in the analog stream. Without this schedule, the STBs would have no way of knowing what preview or other video segment is being played on the TV set.

Headend 22 has a network I/O transceiver 56 which is coupled to headend bus 50 and to distribution structure 30. Transceiver 56 supplies the analog video stream on a designated VOD channel simultaneously to all non-active user interface units. This simultaneous transmission is akin to conventional cable "broadcasting." Alternatively, transceiver 56 is capable of transmitting selective digital video data streams to specific active user interface units which have requested the digital video data streams.

According to an aspect of this invention, the headend transmits an analog video stream of program trailers in an effort to attract viewers who switch to the designated VOD channel. The analog video stream can be immediately displayed on the TV sets without requiring any action or request on the part of the STB. If the viewer does nothing, the set of previews is repeatedly displayed in continuous loop fashion. In this manner, the system does not utilize any digital resources to supply the analog video stream. On the other hand, if the STB initiates request, headend 22 can switch to outputting the requested digital video data streams directly from CMS storage 42.

Figure 2:
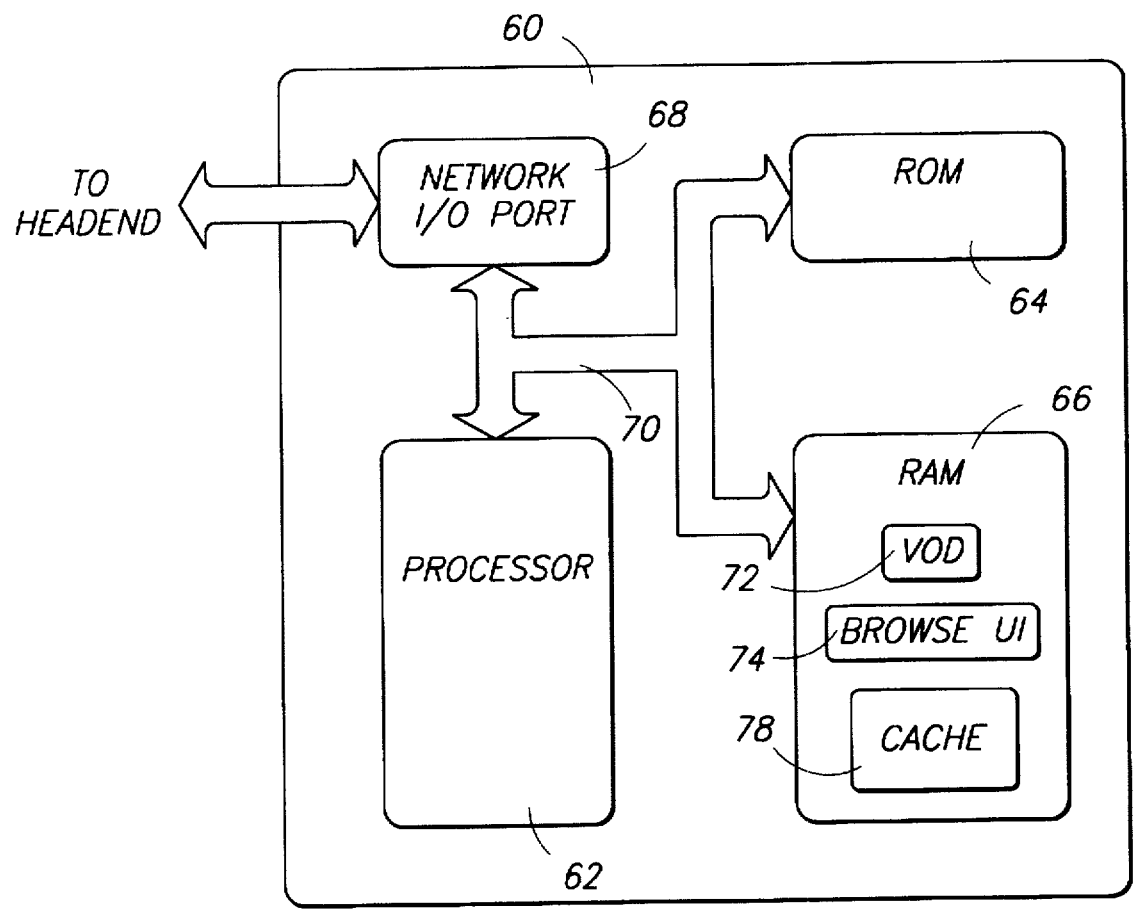
FIG. 2 is a block diagram of a user interface unit according to this invention.

FIG. 2 shows a user interface unit or set-top box 60 according to one implementation of the invention. STB 60 includes a programmable data processor 62, non-volatile memory (ROM) 64, volatile data/program memory (RAM) 66, and network I/O port 68. These components are interconnected via an internal multi-bit conductor or bus 70. Network I/O port 68 is responsive to data processor 62 for communicating with the headend to request and receive the program data records from SQL database 46. The network I/O port receives the analog video stream of trailers from the headend. The network I/O port also receives the digital video data streams of the full length programs and short trailers from continuous media server 40. Network I/O port 68 is preferably a bi-directional transceiver incorporating analog-to-digital and digital-to-analog conversion circuitry.

A video-on-demand (VOD) application 72 runs on STB data processor 62 from data/program memory 66. VOD 72 is an executable program which is downloaded as an object or module from the headend in response to instructions by a viewer. As part of the VOD application, a preview browse user interface (UI) 74 is also configured to execute on data processor 62 from RAM 66. Preview browse UI 74 assists the viewer in navigating through portions of the video-on-demand application. The preview browse UI helps the viewer define a set of criteria used to group programs of interest, and then facilitates the display of preview video trailers on the TV which correspond to these programs. The UI further enables the viewer to "surf" through the various trailers at his/her own pace, and rent a program for immediate viewing.

VOD 72 also maintains a cache 76 in the STB which temporarily stores the program data records received from the headend. Cache 76 is used to store the program IDs and monikers as well as the trailer IDs and monikers.

A viewer enters the VOD application by switching to the designated VOD channel on the set-top box, either by random channel surfing or by directly switching to that channel. When the STB tunes to the VOD channel, the analog video stream of "new releases" previews is immediately depicted, just as it would be for a channel having traditional broadcast or cable programming. The instantaneous display of an on-going preview helps attract the viewer and hold their attention, making the viewer less likely to surf past the VOD channel. The trailers are displayed in a sequential fashion, one after another, to entice a viewer to stay on the VOD channel, watch more previews, and ultimately order a program.

The user interface unit also receives the schedule of previews that has been computed by video processing unit 48, as well as other information pertaining to the previews, such as title, run length, rating, price, and so forth. The schedule is kept in STB cache 78. When a particular trailer is displayed, the STB simultaneously displays some of the information pertaining to the program. For instance, the title and pricing can be overlaid on the video clip. The STB must trust the schedule since it has no other way of confirming what analog clip is actually being displayed.

To ensure this trust, the headend strictly adheres to the schedule posted by the video processing unit. Present media server technology is imprecise and not completely predictable at every moment. Delays, lag times, and data loss can result in a given piece of media running slightly longer or shorter than it is designated to run. The video processing unit constantly monitors the previews against the posted schedule to self-adjust the start and stop times within a cycle of clips. The video processing unit ensures that each video clip begins at the posted schedule time, and if necessary, will prematurely end a previous clip that runs over schedule or add blank time to a clip that finishes under schedule.

Figure 3:
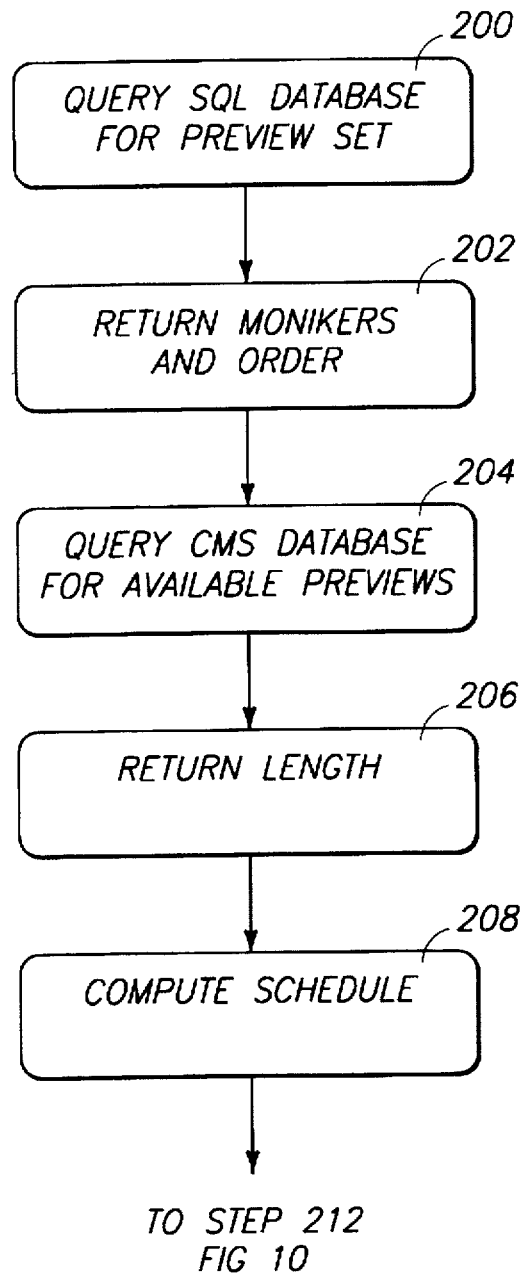
FIG. 3 is a flow diagram of steps for providing a viewer-attracting analog start up loop in a video-on-demand mode.

The following example describes the scheduling operation performed by the video processing unit during the initial analog loop start up phase with reference to the flow diagram of FIG. 3. For purposes of this example, assume that a new cycle of movie previews is starting precisely at 12:00 pm. Video processing unit 48 queries the program information SQL database 46 for the clip-set to play next (step 200). The SQL database returns information about the programs including title, the order in which the clips are to appear, and monikers for each program (step 202). The following data is constructed:

| Sequence | Title | Moniker |
| --- | --- | --- |
| 1 | The Firm | tr_firm.mod |
| 2 | Patriot Games | tr_patgam.mod |
| 3 | Forrest Gump | tr_gump.mod |
| 4 | The Lion King | tr_lking.mod |
| 5 | Shadowlands | tr_shlnds.mod |
| 6 | Little Women | tr_litwmn.mod |
| 7 | Wall Street | tr_wallst.mod |

According to this line-up, video processing unit 48 will play the trailers for "The Firm", "Patriot Games", and so forth, in that order. When the last trailer is reached, the clip-set is repeated beginning with the "The Firm". Video processing unit 48 next queries CMS database 40 using the trailer monikers to determine the availability of the trailers (step 204). The CMS database returns information pertaining to the trailers, including their length, as follows (step 206):

| Block | Length | Moniker |
| --- | --- | --- |
| 152 | 0:02:32 | tr_litwmn.mod |
| 152 | 0:02:32 | tr_firm.mod |
| 151 | 0:02:31 | tr_lking.mod |
| 146 | 0:02:26 | tr_wallst.mod |
| 139 | 0:02:19 | tr_shlnds.mod |
| 139 | 0:02:19 | tr_gump.mod |
| 136 | 0:02:16 | tr_patgam.mod |

Scheduler 54 in video processing unit 48 uses this data to compute a play schedule, beginning with the first movie preview for "The Firm" at noon, and adding a buffer interval of approximately two seconds blank time between each preview (step 208). The following schedule is produced by scheduler 54:

| Sequence | Title | Start Time |
| --- | --- | --- |
| 1 | The Firm | 12:00:00 pm |
| 2 | Patriot Games | 12:02:34 pm |
| 3 | Forrest Gump | 12:04:55 pm |
| 4 | The Lion King | 12:07:28 pm |
| 5 | Shadowlands | 12:09:49 pm |
| 6 | Little Women | 12:12:23 pm |
| 7 | Wall Street | 12:14:51 pm |

The video processing unit posts the schedule in the program information SQL database.

To play each trailer, the video processing unit uses the associated trailer moniker to access the program and trailer storage 42 in CMS 40 and retrieve the appropriate digital file. The digital video data stream is converted by the video D/A converter 52 in video processing unit 48 to output an analog video stream to the user interface units.

At exactly 12:00 noon, the headend transmits the analog video stream for the preview of "The Firm". If the preview ends on time, at 12:02:32 pm, the video processing unit queues up the preview clip for "Patriot Games", but does not begin play until the scheduled time of 12:02:34 pm. If, on the other hand, the preview for "The Firm" has not completed by 12:02:32, the video processing unit stops the preview short and prepares to play the preview for "Patriot Games" on its scheduled time. In this manner, the STB can be assured that the clips conform to the posted scheduler.

Figure 4:
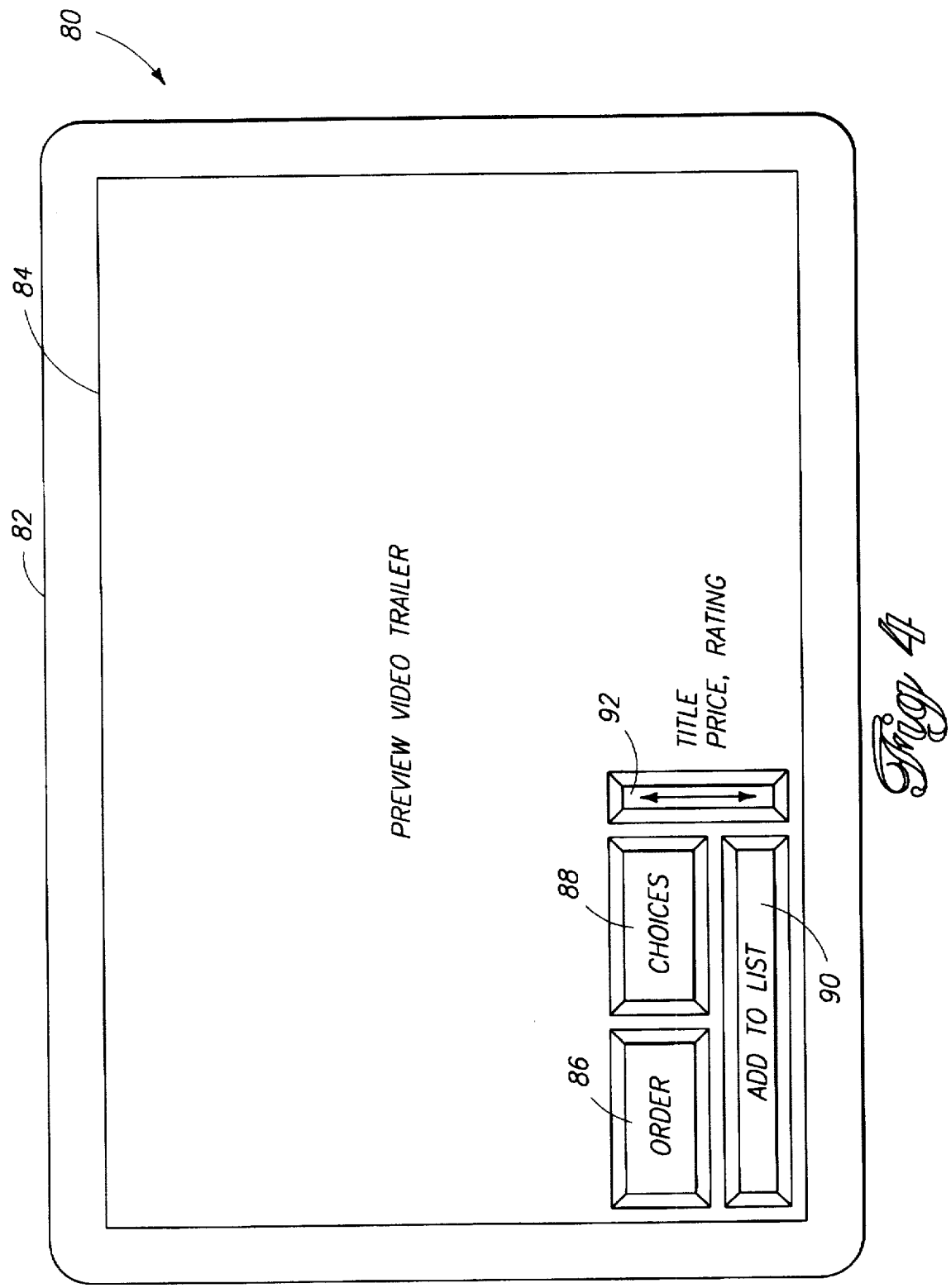
FIG. 4 is an exemplary screen illustration of a video-on-demand application, and particularly, of an initial screen in a preview browse user interface.

FIG. 4 shows an initial screen display 80 of the preview browse UI. In this graphic illustration, outer rectangle 82 represents the television screen. An inner rectangular area 84 represents the standardized NTSC video safe zone, which is the area of a TV screen that is presumed to be viewable on any set. The "new releases" trailers are played in area 82 in full-screen video, thereby ensuring that the filmmaker's art in crafting the preview will be given its maximum possible visual impact.

The preview browse UI has multiple actuatable graphical icons overlaid on the video trailers. In initial screen display 80, four icon buttons are present at the lower-left corner: an "order" button 86, a "choices" button 88, an "add to list" button 90, and an integrated "up/down" button 92. The buttons are 75 percent transparent and placed directly over the video trailer. The graphical icon buttons are arranged within video safe area 84.

The "order" button 86 enables the user to order a video content program that corresponds to the displayed analog preview video trailer, without reverting to a blank order menu or the like. Suppose the viewer wishes to rent the program that is presently being previewed. The viewer simply actuates the overlaid "order" button 86 which causes the STB to send a message to the headend. This message contains some descriptor of the trailer (such as its ID or moniker) or some descriptor of the program (such as its ID or moniker) that corresponds to the trailer being depicted. This information is initially supplied to the STB as part of the schedule information obtained from the SQL database when the VOD application is initiated. The descriptor is used by the CMS database to retrieve the full length video content program. The headend then transmits the full length video content program as a digital video data stream over the distribution network to the STB that ordered the program.

The "choices" button 88 enables the viewer to choose different criteria for grouping programs into manageable sets for a more selective review. For instance, the criteria might be by star name, category type (e.g. new releases, westerns, oldies, foreign films), or kind (i.e., video games, movies, TV shows). Another particularized grouping is a customized list of programs assembled by the viewer, which is described below in more detail.

The "add to list" button 90 permits the viewer to create a customized list of personal favorites that he/she might wish to watch some day. As the viewer browses the trailers, the viewer can simply click the "add to list" button 90 and the program ID of the video content program associated with the presently displayed trailer is added to the customized viewer list. The list is kept at the headend in the program information database.

The "up/down" button 92 enables the viewer to skip through the preview video trailers, forwards and backwards, in the same manner that the viewer is accustomed to channel surfing through traditional cable channels. This allows the viewer to control the pace at which he/she watches the previews, skipping over uninteresting ones or replaying previews of interest.

A focus frame, or the like, can be used to highlight the operable button. To enhance intuitive visual feedback to the viewer, the program browse UI provides a graphical change to indicate when an icon button is depressed. This provides a visual and auditory feedback which the user associates with the manual actuation and tactile sensation of depressing a physical control button on the STB or remote control handset. This feedback is helpful in the interactive environment because the viewer might experience a slight delay, albeit very short, between the time he/she depresses the physical control button and the time the appropriate response to the control is depicted on the TV. By graphically changing the icon, the viewer is visually informed that his/her command has been received and is in the process of being completed.

A space adjacent to the icon buttons is reserved for displaying textual information pertaining to the program preview that is being shown. This information includes the title, rental price, and rating, although any other program related information can also be displayed (e.g., cast names, close caption, brief description, director, etc.). This information is included in the program data records or schedule.

To continue the above example, the analog video stream of "new release" movies is played in sequential order, beginning with "The Firm". If the viewer does nothing, the previews cycle through, over and over. The analog video stream consumes no digital resources and thus the viewer's inactivity does not unduly tie up the interactive network. The viewer might, however, choose to interactively engage the VOD application. For instance, the viewer can immediately order a program from the initial UI screen 80 using "order" button 86; add the program to their customized list using the "add to list" button 90; skip through the previews using "up/down" button 92; or pop up other search criteria using "choices" button 88 to select a new criteria for grouping programs.

Upon some form of request or activity on the part of a user interface unit, the headend will establish a dedicated digital circuit that will quickly and independently respond to the special requests made by the user interface unit. For example, the viewer might request display of a different set of preview clips. In response to this request, the headend locates, retrieves, and transmits the requested preview clips, but this time as digital video data streams. The analog video stream is stopped. Following a period of inactivity after the viewer is done browsing and has not ordered a program, the headend will revert back to transmitting a predefined clip-set of previews (such as the "new releases") as an analog video stream. This automatic reversion to analog transmission helps reduce demand for the digital resources.

Figure 5:
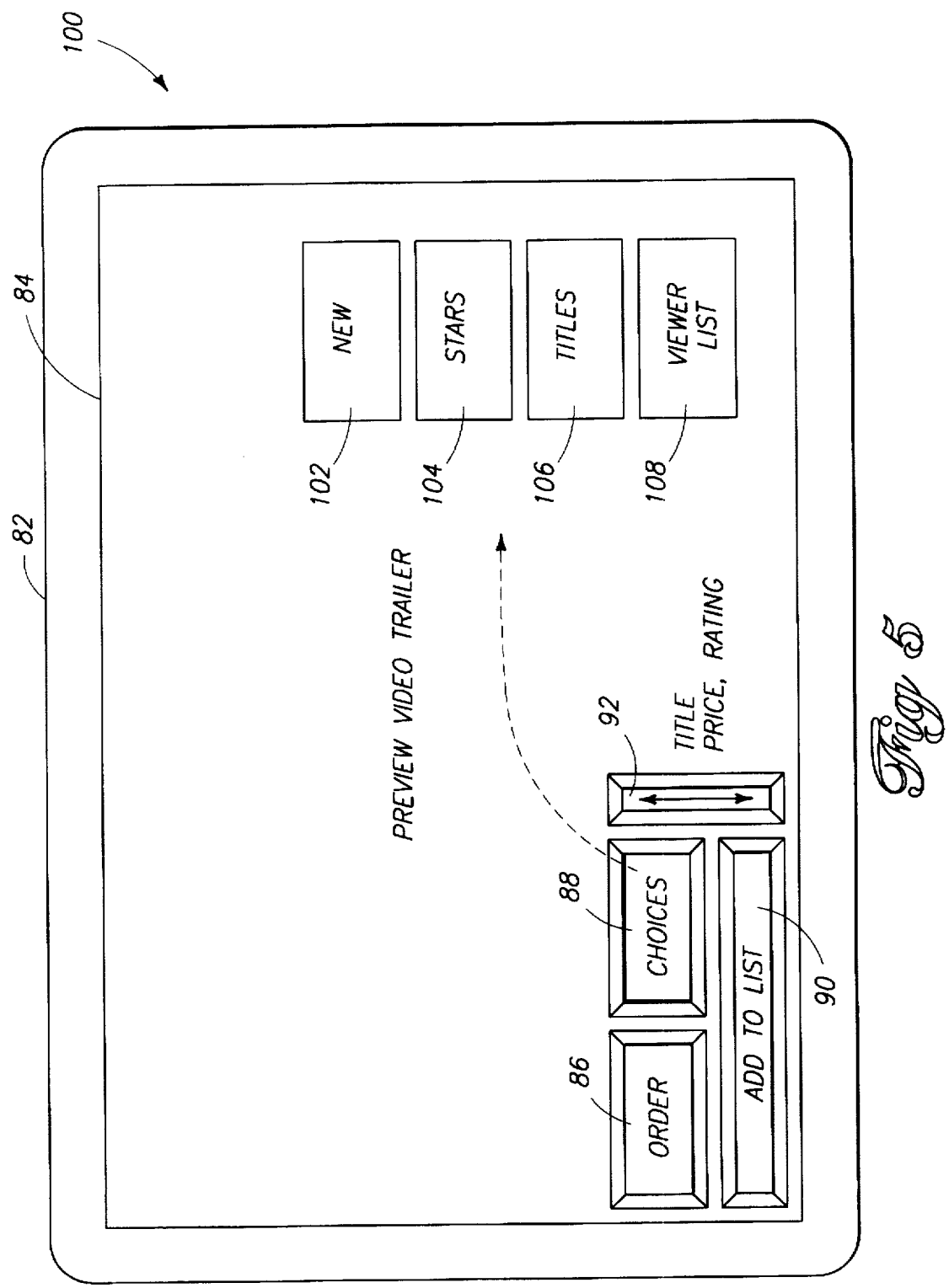
FIG. 5 is another exemplary screen illustration of the preview browse user interface, appearing subsequent to the FIG. 4 screen.

FIG. 5 shows a screen display 100 that is depicted when a viewer selects the "choices" button 88 to pull up possible search criteria for different sets of programs. For discussion purposes, an example four criteria selection icon buttons pop up (as represented by the dashed arrow, which is not shown on the screen): a "new" button 102 which activates a list of programs that are newly released, a "stars" button 104 which activates a list of stars, a "titles" button 106 which pulls up a list of program titles, and a "viewer list" button 108 which presents the personal customized list of programs. These four icon buttons are overlaid on the displayed video trailers.

Figure 6:
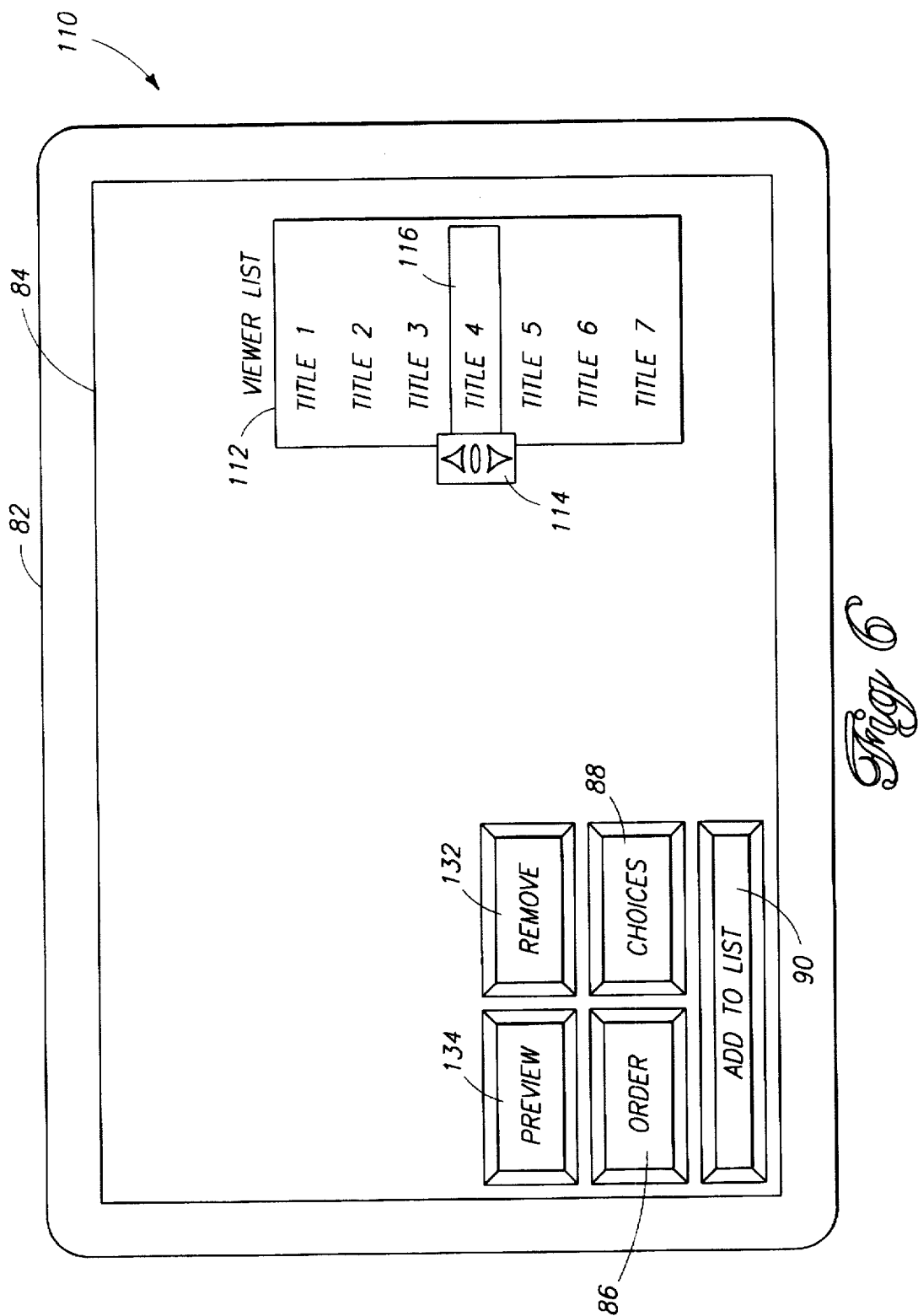
FIG. 6 is yet another exemplary screen illustration of the preview browse user interface, which can appear subsequent to the FIG. 5 screen.

FIG. 6 shows a screen display 110 following selection of one of the criteria selection buttons 102–108 from screen display 100 (FIG. 5). In this example screen display, the viewer has selected the "viewer list" button 108 to bring up a customized list of movies 112 which the viewer has assembled. In response to this actuation, the STB processor sends a message which contains the viewer ID to the headend. In response, the headend retrieves from the program information database a customized list of preferred video content programs that are correlated with the viewer ID. The customized list is downloaded to the STB memory. The titles of the programs from all or a portion of the customized list is presented as a scrollable list 112. A graphical up/down arrow 114 indicates that the list can be bi-directionally scrolled upwards or downwards. In this implementation, the list scrolls while a focus bracket 116 remains stationary.

Figure 7:
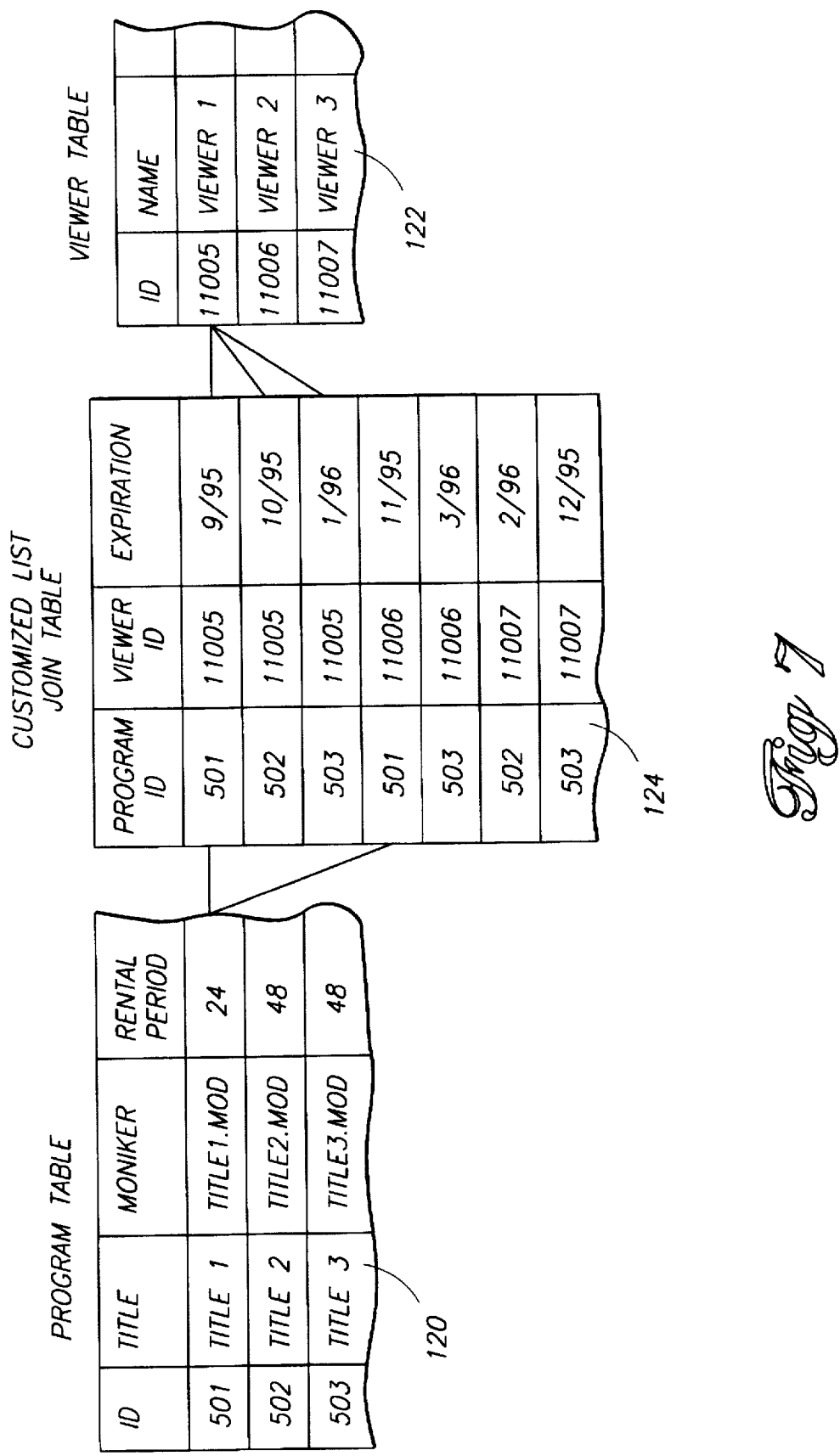
FIG. 7 is a simplified example of database records and a join table used to correlate viewer and program IDs.

FIG. 7 shows an implementation for correlating the viewer IDs with the program IDs of the video content programs at the headend to help respond to a query for the viewer's own customized list. The SQL database at the headend maintains a program table 120 which stores the records pertaining to the programs. Table 120 contains a program ID, title, moniker, as well as other information. Program table 120 further includes a rental period associated with each program.

The SQL database also maintains a viewer table 122 which contains a list of viewers and their associated unique IDs. A join table 124 correlates the program IDs from program table 120 and the viewer IDs from viewer table 122. A join table offers a many-to-many relationship between items listed in different tables. For example, the same program may be found on many different customized lists. Each item is stored in one place within the database, and redundancy is limited to the join tables. In the illustrated example, viewer 1 has a list of three programs, having "title 1", "title 2", and "title 3". Thus, the viewer's ID 11005 is tied to the program IDs 501, 502, and 503 in join table 124.

Join table 124 also has a field for an expiration date associated with the listed program. The expiration date marks when the video content program will be automatically removed from the customized list in the event the viewer has not rented the program by that date. The expiration date is typically set a number of months in the future so that programs will not be prematurely removed from the list. The inclusion of an expiration date, however, helps maintain the customized lists so that they do not grow uncontrollably over a period of time.

When the headend receives the viewer ID from the user interface unit, join table 124 is easily and quickly searched to find all program IDs that correlate to the viewer ID and which have not expired. The database returns information of the video content programs that are correlated with the viewer ID. The full program records of the tagged program IDs are then retrieved from the SQL database. The headend also retrieves the monikers and IDs of the trailers associated with the identified programs from the SQL database. The programs are correlated with corresponding trailers within the database to simplify the task of cross-referencing the programs and trailers.

FIG. 8 shows one implementation for correlating the full length video content programs with their associated preview video trailers. The SQL database maintains a trailer table 126 which contains a list of information pertaining to trailers, including the ID, name, and moniker. A join table 128 correlates the IDs of the full length programs with the IDs of their associated preview clips. Accordingly, the SQL database can be queried using the program ID to return the related trailer ID of the associated preview clip. Once the trailer ID is determined, other information about the trailer, such as its moniker, can be quickly accessed.

To continue the above example, the headend queries program/viewer join table 124 (FIG. 7) using the viewer ID to retrieve a customized set of programs that the viewer has assembled. The headend also retrieves information pertaining to the trailers for those programs, using the program IDs to index the program/trailer join table 128 (FIG. 8). The headend transmits the programming information back to the user interface unit over the distribution network.

FIG. 9 shows an example data packet 130 transmitted from the headend to the STB. Data packet 130 contains program titles, runtime length of the programs, program IDs, program monikers, trailer IDs, trailer monikers, and rental periods. This packet is received and deciphered by the STB processor and the information contained therein is stored in the RAM. The programming information is used by the STB to form viewer list 112 (FIG. 6). As described above, the customized viewer list 112 can be scrolled upwards and downwards at a selectable rate to see all of the titles contained in the list.

With reference again to FIG. 6, notice that screen display 110 includes a "remove" icon button 132 which can be actuated to delete the highlighted program title from the list. Upon actuation of "remove" button 132, the user interface unit signals the headend to remove the association in join table 124 between the viewer ID and the program ID of the removed program. Alternatively, the viewer can add programs to the list by actuating the "add to list" icon button 90, whereby the user interface unit informs the headend to associate the program ID of the added program with the viewer ID in join table 124. This feature enables the viewer to interactively assemble his/her own list 112 of preferred programs, adding titles to it and removing titles from it.

With reference to FIG. 6, the preview browse UI has a "preview" icon button 134 which can be actuated to preview the group of programs in the viewer list. Upon election of the "preview" button, the user interface unit sends the moniker of one of the preview trailers to the headend along with a request to begin transmitting the corresponding video stream. Alternatively, the user interface unit might send a begin transmission signal, with the headend already knowing which set of clips to transmit. The headend transmits the video previews in sequential order according to the order shown on the displayed list. Preferably, the monikers and IDs of the trailers and associated programs are queued in the STB memory in a queue order that corresponds to the sequential order in which the associated preview trailers are transmitted.

It is noted that the headend transmits the new series of trailers as digital video data streams. The requested clip set thereby replaces the start up analog video stream of "new releases" trailers. It is only at this point that the system begins to consume digital resources in transmitting a video stream from the headend to the user interface unit.

If left alone, the trailers for the selected list (e.g., the viewer's customized list) will run in a continuous loop, one after another. The viewer can leisurely watch the short set of trailers for the listed programs without interrupting them. Alternatively, the viewer can optionally skip over previews of uninteresting programs or repeat previews of attractive programs.

In the illustrated implementation, "up/down" control button 92 (FIG. 4) operates as "next/previous" buttons which enable the viewer to skip from a presently displayed trailer to a next or previous trailer. When activated, the user interface unit sends the next or previous moniker in the queue order back to the headend. The moniker is used to access the continuous media server storage to retrieve the next or previous trailer. The headend then ceases sending the present trailer and begins transmitting the retrieved next/previous trailer so that the transition appears almost instantaneous to the viewer. This interactive feature allows the viewer to surf through the video clips at their own pace.

The "next/previous" operation directly corresponds to the "up/down" operation of traversing a list. Flipping backward through previous trailers is essentially the same as moving up through the list and skipping forward to next trailers is like moving down through the list, even though the list is not actually displayed. When the viewer reaches the end of a set of previews, the previews loop back to the beginning of the list in a continuous manner. After a period of inactivity from the viewer, however, the STB will automatically revert to the default analog stream of programs.

Figure 10:
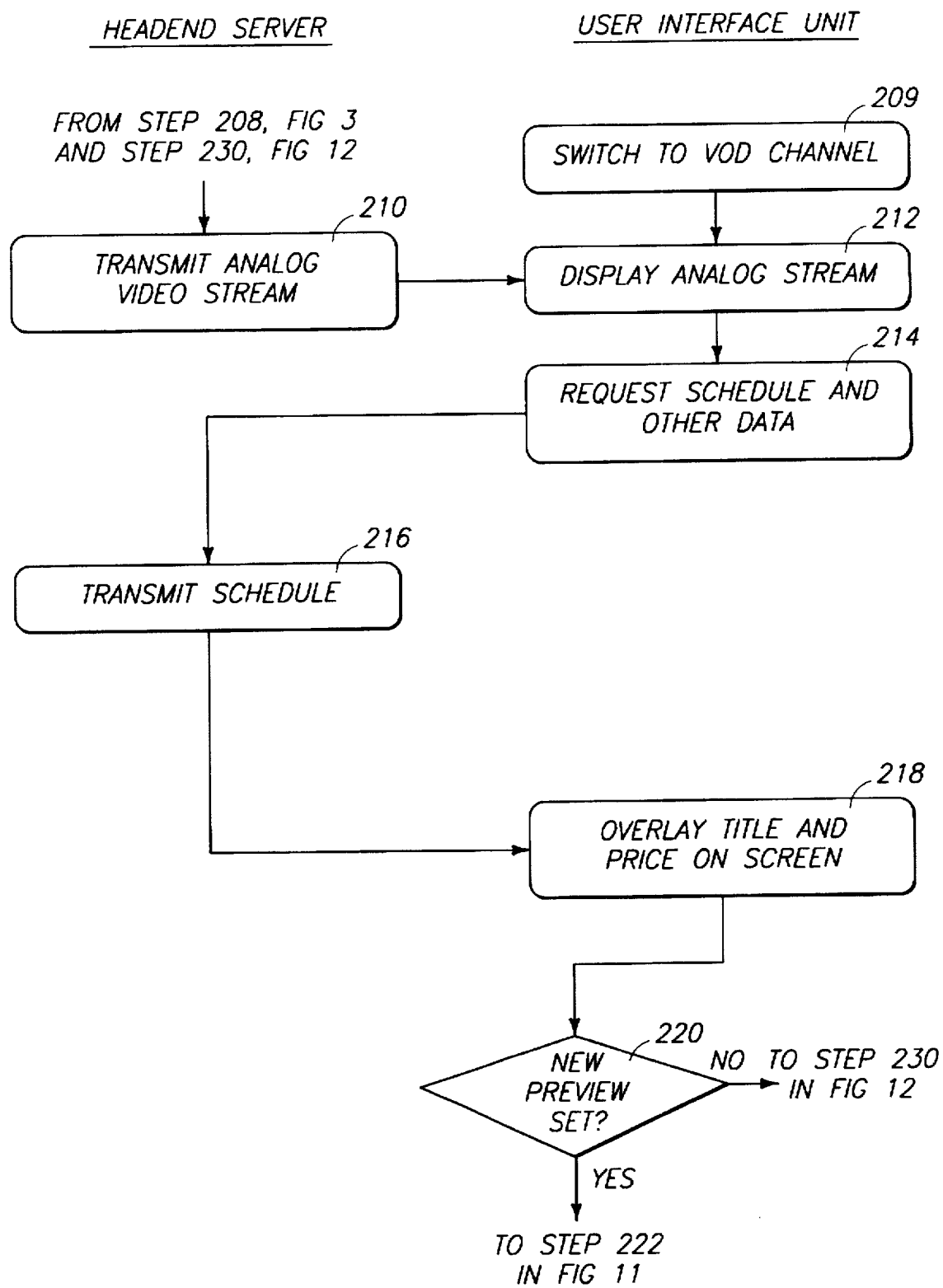
FIGS. 10-12 present a flow diagram of steps for operating an interactive entertainment network system in a video-on-demand mode according to this invention.
Figure 11:
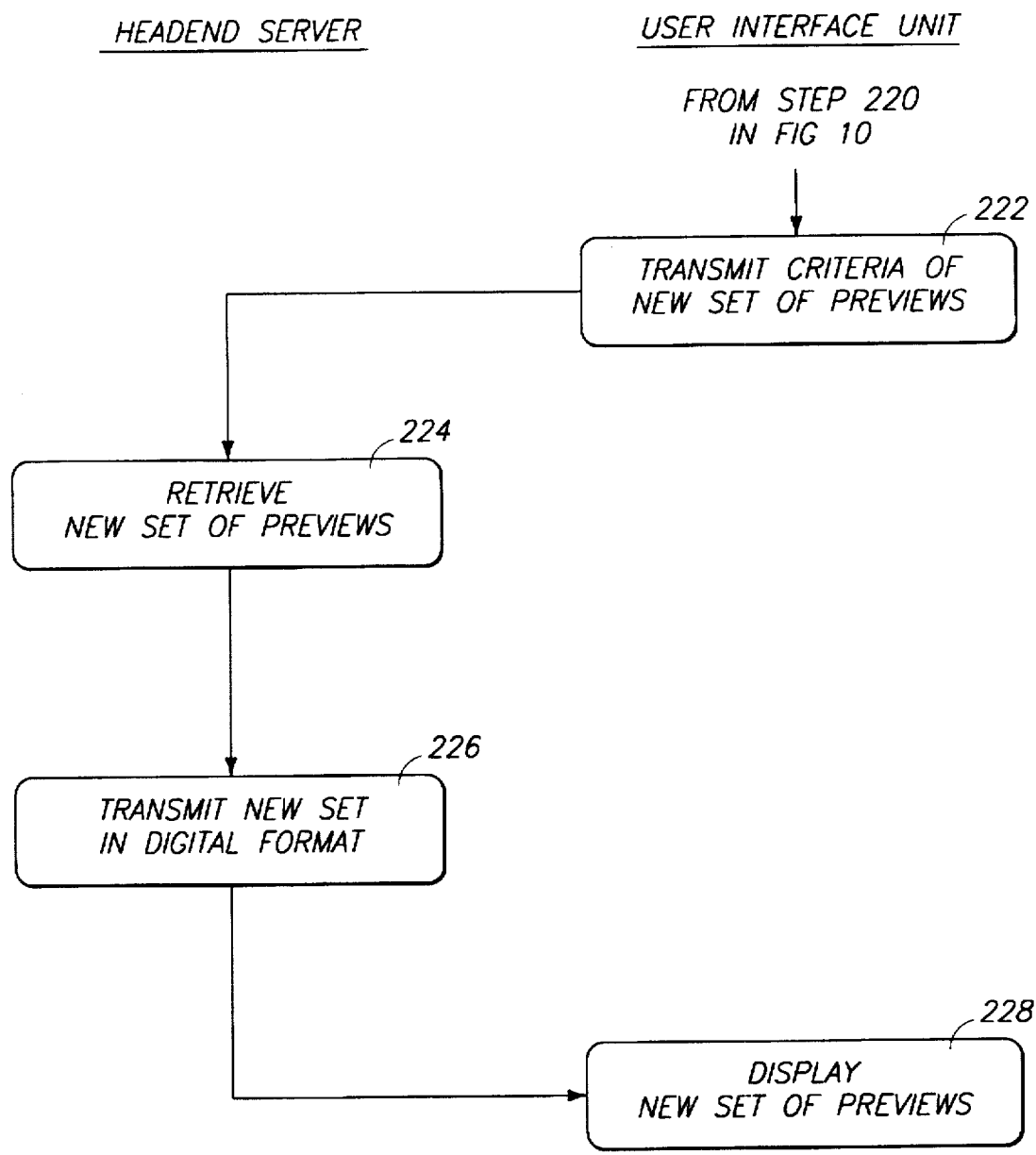
Figure 12:
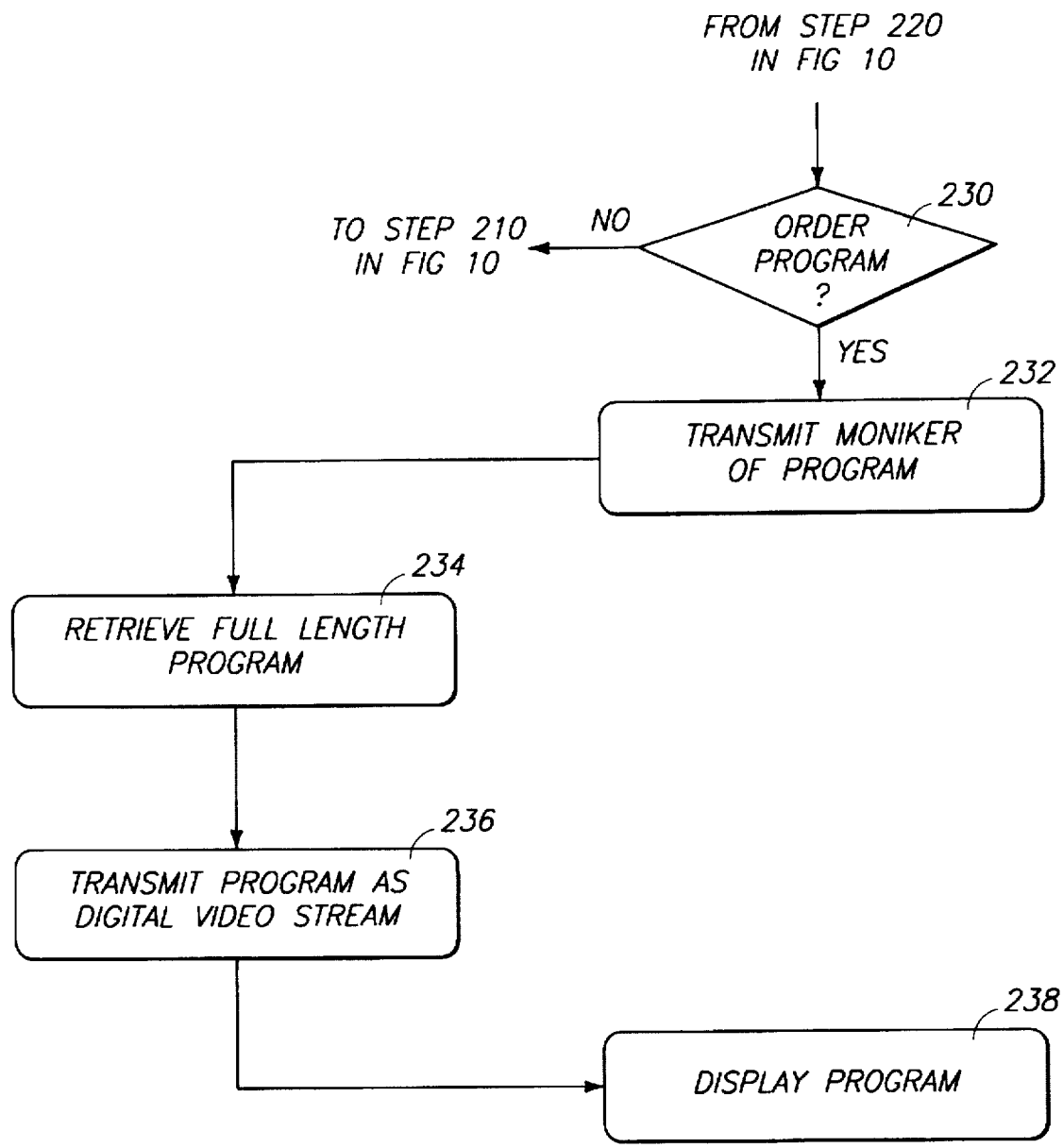

FIGS. 10–12 show a method for operating an interactive entertainment network system of this invention in a video-on-demand mode. To promote clarity, the flow diagram illustrates exemplary steps as though they are performed at either the headend server or user interface unit. Beginning with step 209 in FIG. 10, the viewer activates the VOD application by switching the STB to the designated VOD channel. During this time, the headend server is continually transmitting an analog video stream of a set of previews over the VOD channel (step 210). As soon as the STB tunes to the VOD channel, the previews are immediately displayed (step 212). To continue our above example, the default set of "new releases" trailers are shown. The VOD application initiates the preview browse user interface and the initial screen display 80 (FIG. 4) is depicted, with the analog video stream running in full screen view.

At step 214, the STB requests the schedule and other data from the headend. Such information is kept in the SQL database. The headend transmits the schedule and program data records of interest (step 216). The schedule includes the title, pricing, star name, and other information pertaining to the preview or program. This initial communication packet is provided in digital format, but consumes very little digital resources. Indeed, the packet might be only a few kilobytes in size, which is comparatively insignificant to the size of a digital video file.

The STB overlays the title and price, as well as any other information, on the screen display of the running analog stream (step 218). The viewer can leisurely watch the clips. If the viewer remains passive, the "new releases" trailers will run in a continuous loop, one after another. The viewer can, however, select a new set of previews, browse titles, skip through clips, or order a movie by actuating different control functions at the STB.

At step 220, it is determined if the viewer wishes to select a new group of previews. To choose another preview set, the viewer actuates "choices" button 88 to pull up lists of criteria (e.g., star name, title, viewer list, etc.) as shown in FIG. 5. From the one or more lists, the viewer actively specifies a criteria to select a group of previews. If the viewer selects a new grouping (i.e., the "yes" branch from step 220), the STB transmits criteria for a new set of previews to the headend (step 222 in FIG. 11).

At the headend, a search of the SQL database is conducted to locate program records which meet the search criteria. The program data records contain the monikers to access the appropriate set of previews. The headend uses the monikers to index the CMS database and retrieve the new set of previews (step 224). Because this set of previews is provided in response to an affirmative inquiry from the STB, the new preview set is transmitted in their digital format directly to the STB (step 226). There is no conversion by video processing unit 48 at the headend. The digital video stream is then displayed on the viewer's TV set (step 228).

The transition from analog to digital format in response to a viewer request enables a fully interactive environment between the headend and STB. The digital video data stream of previews can now be easily manipulated by the viewer according to their own preferences. For example, the viewer can fast forward, pause, rewind, stop, or play the previews in the same manner that he/she would control a conventional VCR. Additionally, the viewer can skip through the previews, forward and backward. This interactive control is not possible with an analog video stream.

With reference again to step 220 in FIG. 10, if the viewer does not select a new set of previews (i.e., the "no" branch from step 220), it is determined whether the viewer desires to order a program (step 230 in FIG. 12). If the STB receives no order request, the analog video stream is continued until the viewer initiates some kind of request, as indicated by the negative flow path back to step 210 in FIG. 10. On the other hand, if the viewer orders a particular program (i.e., the "yes" branch from step 230), the STB transmits the program moniker to the headend (step 232). The program moniker is relates to the analog preview video clip that is presently being shown. The program moniker is used to access the CMS database and retrieve the full length program (step 234). This program is then transmitted in its digital format (step 236) to again afford the viewer control over the program, including fully interactive shuttle control (i.e., fast forward, rewind, play, pause, stop). The digital stream is converted by the STB into an analog signal which is displayed on the viewer's TV set (step 238). It is noted that a similar order process can be used for digitally transmitted previews, like the previews that are selected as part of a new grouping.

The means for performing the steps of the method are described above with reference to FIGS. 1–9.

The interactive entertainment network system of this invention is advantageous in many respects. One advantage is that it provides an immediate video display upon tuning to the VOD channel. The instantaneous display of previews help attract viewers that might be "surfing" through the channels. The VOD channel thereby instantly supplies video stimulus just like any other channel. Another advantage is that the system promotes intuitive ordering of programs. The program title, price, and an "order" button are overlaid on top of the video display. A viewer can simply actuate the "order" icon to rent the full digital version of the analog preview being displayed.

Another advantage is that the interactive entertainment network system of this invention preserves precious digital resources. The "broadcast" of previews in analog format consumes no digital switching. If the viewer makes no requests, or simply changes to another channel, the system never establishes a dedicated digital connection between the headend and the viewer's STB. Conversely, if the viewer initiates communication, all subsequent exchanges between the headend and STB are done in a digital format. This design implementation thereby prevents waste of digital switching for non-active participants while still affording a high quality, fully interactive system for all active participants.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

I claim:

1. In an interactive entertainment network system in which a content provider serves video content programs to one or more user interface units over a distribution network, the content provider having a storage medium to store the video content programs and associated preview video trailers about the video content programs in digital format, a system comprising:

a video processing unit at the content provider to convert preview video trailers from the digital format to an analog format and thereby form an analog video stream for transmission to the user interface units;

the video processing unit being configured to determine a schedule of the preview video trailers for transmission to the user interface units, the schedule defining an order that the preview video trailer appear within the analog video stream to be supplied to the user interface units; and an on-demand application resident at a user interface unit to display the analog video stream when the user interface unit initially executes the on-demand application and to generate requests for services from the content provider in response to user input; and the video processing unit, in response to receiving a request from the on-demand application, outputting the preview video trailers and video content programs as digital video data streams.

2. A system as recited in claim 1 wherein the analog video stream contains a selected number of preview video trailers which are repeatedly shown in a continuous loop.

3. A system as recited in claim 1 wherein:

the on-demand application is activated when the user interface unit is tuned to a designated on-demand channel; and the analog video stream is transmitted on the on-demand channel so that the preview video trailers are readily displayed when a viewer tunes to the on-demand channel.

4. In an interactive entertainment network system in which a content provider serves video content programs to one or more user interface units over a distribution network, the content provider having a storage medium to store the video content programs and associated preview video trailers about the video content programs in digital format, a system comprising:

a video processing unit at the content provider to convert a set of preview video trailers from the digital format to an analog format and thereby form an analog video stream for transmission to the user interface units;

an on-demand application resident at a user interface unit to enable a viewer to select a different set of preview video trailers and to send a request for the different set to the content provider; and in response to the request, the video processing unit transmits the different set of preview video trailers as digital video data streams to the requesting user interface unit.

5. A system as recited in claim 4 wherein the video processing unit reverts to transmitting preview video trailers as an analog video stream to the requesting user interface unit following a period of inactivity from the requesting user interface unit.

6. A system as recited in claim 1 wherein the video processing unit strictly adheres to the schedule by timely transmitting the start of each preview video trailer at a scheduled time.

7. A system as recited in claim 1 wherein:

the video processing unit transmits data records which contain information pertaining to the preview video trailers; and the on-demand application displays the preview video trailers while simultaneously overlaying the information pertaining to the preview video trailers.

8. A system as recited in claim 1 further comprising a video-on-demand user interface which executes on the user interface unit, the video-on-demand user interface enabling a viewer to order a video content program directly from a displayed analog preview video trailer.

9. A content provider for an interactive system, comprising:

a storage medium to store the video content programs and associated preview video trailers about the video content programs in a digital format;

a video processing unit connected to the storage medium to convert the preview video trailers from the digital format to an analog format and thereby form an analog video stream for output to the user interface units;

the video processing unit determining a schedule of the preview video trailers in an order that they appear within the analog video stream; and in response to receiving a request from a particular user interface unit, the video processing unit enables output of the preview video trailers and video content programs as digital video data streams.

10. A content provider according to claim 9 wherein the video processing unit reverts to the analog format for output of the preview video trailers as the analog video stream following a period of inactivity from the particular user interface unit.

11. In an interactive entertainment system having a content provider which stores video content programs and associated preview video trailers in digital format and provides the program content programs and preview video trailers to user interface units, a method for operating the content provider comprising the following steps:

converting a set of preview video trailers from a digital format to an analog format at the content provider;

transmitting the preview video trailers as an analog video stream from the content provider to a particular user interface unit; and in response to receiving a request for a different set of preview video trailers, transmitting the different set of preview video trailers as digital video data streams from the content provider to the particular user interface unit.

12. A method as recited in claim 11 further comprising the following additional step:

reverting to transmitting the preview video trailers as an analog video stream to the particular user interface unit following a period of inactivity from the particular user interface unit.

13. A method for operating an interactive entertainment system in a video-on-demand mode, the interactive entertainment system having a content provider which stores preview video trailers about associated video content programs in a digital format and provides the preview video trailers to a user interface unit, the method comprising the following steps:

converting the preview video trailers from a digital format to an analog format at the content provider;

determining a schedule of the preview video trailers in an order that the preview video trailers appear within the analog video stream;

activating the video-on-demand mode at a particular user interface unit;

transmitting the preview video trailers as an analog video stream from the content provider to the particular user interface unit; and transmitting the schedule to the particular user interface unit.

14. A method as recited in claim 13 further comprising the following additional steps:

displaying the preview video trailers at the particular user interface unit;

transmitting data records with information pertaining to the video segments; and overlaying the information pertaining to the preview video trailers on the displayed preview video trailers.

15. A method for operating an interactive entertainment system having a content provider which stores video content programs and associated preview video trailers about the video content programs in a digital format and provides the video content programs and preview video trailers to a plurality of user interface units, the method comprising the following steps:

converting the preview video trailers from a digital format to an analog format at the content provider;

computing a schedule of the preview video trailers in an order that they appear within the analog video stream;

transmitting the preview video trailers as an analog video stream from the content provider to a user interface unit;

transmitting the schedule to the user interface unit;

requesting, at the user interface unit, a full length video content program that is associated with one of the preview video trailers; and transmitting the full length video content program as a digital video data stream to the user interface unit.

16. A method as recited in claim 15 further comprising the following additional steps:

displaying the preview video trailers at the user interface unit;

transmitting data records with information pertaining to the preview video trailers; and overlaying the information pertaining to the preview video trailers on the displayed preview video trailers.

17. A method as recited in claim 15 further comprising the step of repeatedly transmitting a selected number of preview video trailers in a continues loop until said requesting step occurs.

18. A program embodied on a computer-readable medium, for use in an interactive entertainment system having a content provider which stores video content programs and associated preview video trailers in digital format, the program comprising:

computer-readable instructions for converting a set of preview video trailers from a digital format to an analog format;

computer-readable instructions for transmitting the preview video trailers as an analog video stream; and computer-readable instructions for transmitting, in response to receiving a request for a different set of preview video trailers, the different set of preview video trailers as digital video data streams.

19. For use in an interactive entertainment system having a content provider which stores preview video trailers about associated video content programs in a digital format and provides the preview video trailers to a user interface unit, computer-readable media resident at the content provider and the user interface unit comprising:

computer-readable instructions for converting the preview video trailers from a digital format to an analog format at the content provider;

computer-readable instructions for determining a schedule of the preview video trailers in an order that the video segments appear within the analog video stream;

computer-readable instructions for activating the video-on-demand mode at a particular user interface unit;

computer-readable instructions for initially transmitting the preview video trailers as an analog video stream from the content provider to the particular user interface unit; and computer-readable instructions for transmitting the schedule to the particular user interface unit.

20. For use in an interactive entertainment system having a content provider which stores video content programs and associated preview video trailers about the video content programs in a digital format and provides the video content programs and preview video trailers to a plurality of user interface units, computer-readable media resident at the content provider and the user interface unit comprising:

computer-readable instructions for converting the preview video trailers from a digital format to an analog format at the content provider;

computer-readable instructions for computing a schedule of the preview video trailers in an order that they appear within the analog video stream;

computer-readable instructions for transmitting the preview video trailers as an analog video stream from the content provider to a user interface unit;

computer-readable instructions for transmitting the schedule to the user interface unit;

computer-readable instructions for requesting, at the user interface unit, a full length video content program that is associated with one of the preview video trailers; and computer-readable instructions for transmitting the full-length video content program as a digital video data stream to the user interface unit.

21. In an interactive entertainment system having a content provider which stores video content programs and associated preview video trailers about the video content programs in a digital format and provides the video content programs and preview video trailers to a user interface unit, computer-readable media resident at the content provider having computer-executable instructions for performing steps comprising:

converting the preview video trailers from a digital format to an analog format;

computing a schedule of the preview video trailers in an order that they appear within the analog video stream;

transmitting the preview video trailers as an analog video stream from the content provider to a user interface unit; and transmitting the schedule to the user interface unit.

22. A method as recited in claim 13 further comprising the step of repeatedly transmitting the preview video trailers in a continuous loop.

* * * * *